(No Model.)
R. M. COCHRAN.
GRAIN SEPARATOR.
No. 332,786. Patented Dec. 22, 1885.
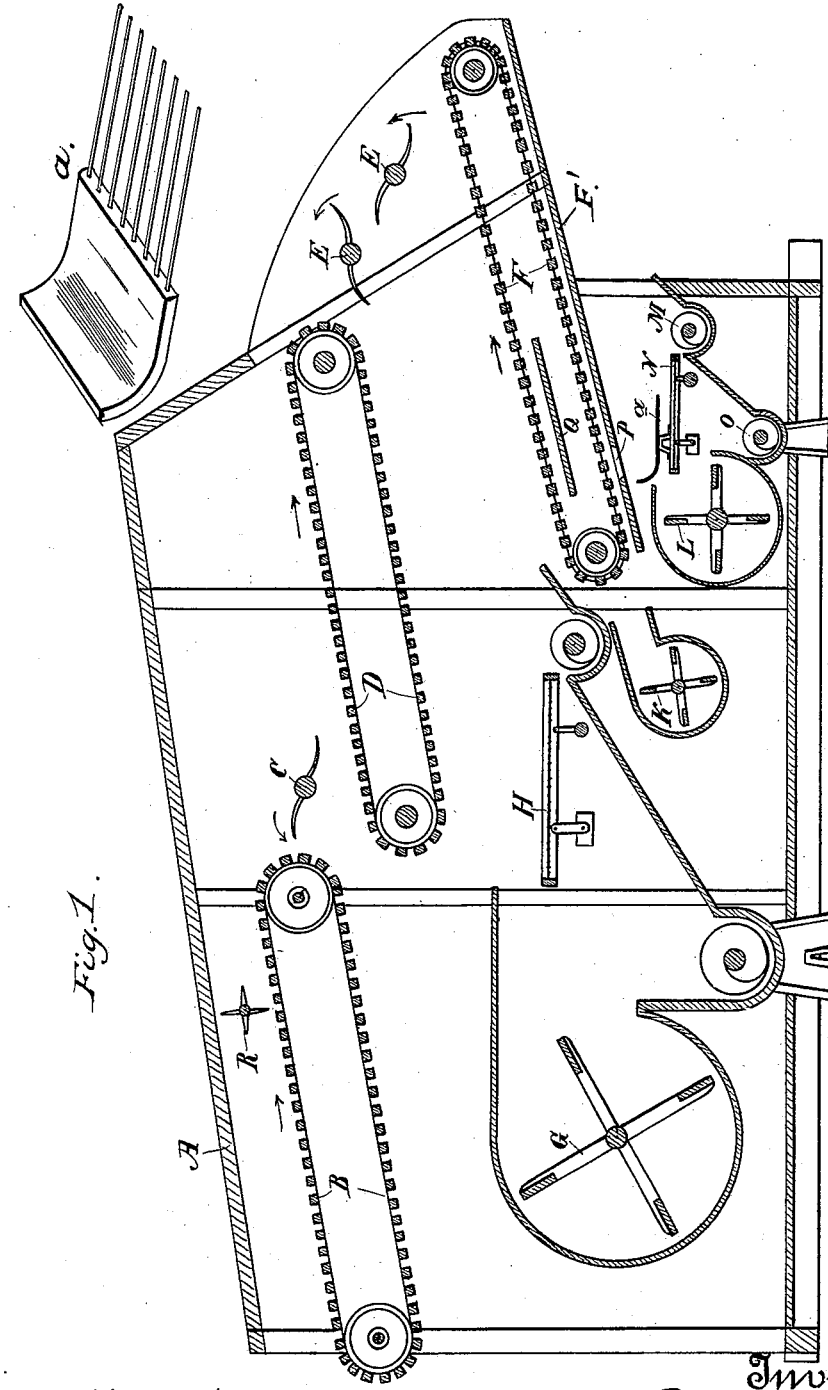
Witnesses,
Geo. H. Strong.
J. H. Nourse.
Inventor,
R. M. Cochran
By Dewey & Co.
Attorneys

UNITED STATES PATENT OFFICE.

RUFUS MYCAJAH COCHRAN, OF JACINTO, CALIFORNIA.

GRAIN-SEPARATOR.

SPECIFICATION forming part of Letters Patent No. 332,786, dated December 22, 1885.

Application filed August 26, 1885. Serial No. 175,402. (No model.)

*To all whom it may concern:*

Be it known that I, RUFUS M. COCHRAN, of Jacinto, Colusa county, State of California, have invented certain Improvements in Grain-Separators; and I hereby declare the following to be a full, clear, and exact description of the same.

My invention relates to certain improvements in machines for separating grain from the straw and chaff after it has been thrashed.

It consists in the construction of devices hereinafter described and claimed.

Referring to the accompanying drawings for a more complete explanation of my invention, Figure 1 is a vertical section taken through the machine. Fig. 2 is a detail to be referred to.

A is a separator-frame, which I have shown without the thrashing cylinder and feeder.

B is the "cell-belt" upon which the grain and straw are carried upward and backward from the thrashing-cylinder.

R is a beater by which the grain is partially separated from the straw, so that it may fall upon the cleaning-screen H as it passes over the upper end of the belt B.

C is a revolving picker, beneath which the straw passes, and which separates it so that any grain which may be entangled in it may fall downward upon the screen H.

D is the straw-carrier, which travels upward and rearward and delivers the straw out at the rear end of the machine. This is usually the rear end of the machine; but in my invention I have added another open slat-belt with partial floors or bottoms over which it travels, pickers for still further separating the straw, and a cleaning screen and rack in connection therewith, as follows:

E E are pickers mounted upon shafts extending across the machine at the rear of the straw-carrier and driven so as to rotate the reverse way from the direction in which the straw is traveling. The straw passes between the pickers and is carried out of the machine by the blast from the fans G and K, as shown.

F is the chaffer, which consists of an open traveling slat-belt running upward and backward at an incline, as shown, beneath the straw-carrier D. The grain which falls out of the straw loosened and separated by the pickers E falls upon the traveling chaffer F, falling through the same and upon the close floor or bottom F', over which the lower portion travels. This lower portion of the belt carries the grain downward over the floor until it reaches a transverse slot, P, which is made through this floor, through which the grain falls upon a rack and screen below. Above this slotted portion of the floor a close floor or bottom, Q, is formed for the upper portion of the belt to travel over, this floor extending upward far enough to cover the slot. After falling through this slot the grain falls upon a rack, *a*, which is fixed just above the screen N, and serves to receive the straw or chaff which may pass through the slot. This rack may consist either of wood or iron rods, (see Fig. 2,) fastened about one inch apart in side bars, and the inner end of the rack is covered with sheet-iron about twelve inches wide, which turns up about three inches and at an angle of about forty-five degrees, so as to prevent the straw from falling upon the screen. The rack is bolted fast to the iron brackets at each side, and is also secured to the screen so as to leave a space of about six inches between itself and the screen. The grain falling upon this screen is cleaned by means of a wind-blast from the fan L in the same manner that the larger portion which falls upon the screen H is cleaned. The cleaned grain passes into the auger-spout O, and is conveyed to one side, where it is delivered into sacks in the usual manner. Any unthrashed heads which may be received upon the screen N pass off to the rear and fall into the conveyer M, and are discharged by it into the lower end of the main elevator, not shown in this drawing, but which is employed by all thrashing-machines to return the unthrashed grain and heads to the thrashing-cylinder again. The upper floor or bottom, Q, over which the upper portion of the belt F passes, is about three feet long, and any grain that may be wasted or blown over the rear end of the main screen H will fall upon this bottom and be carried upward by the belt until it falls through upon the lower bottom, from which it is conveyed through the opening P to a screen, N, as before described. Three fans, G, K, and L, are shown, the fan G producing a blast which passes through the main screen H, and the second fan, K, produces a blast which passes between the upper and lower bottoms, Q and F', of the chaffer, and this is discharged, together with the blast from the fan G, against the pickers E, so as to carry the straw out of the machine. The fan L produces a blast in the secondary cleaning device N. By this construction I am enabled to save a large percentage of grain that is usually discharged with the straw and lost. The slot P is located at such a point in the lower floor of the chaffer that the grain falling through it may be received upon the screen N and cleaned and sacked at that point, thus having the advantage of the extra cleaning-shoe, which would not be possible if the grain were allowed to pass down to the lower end of the chaffer.

Having thus described my invention, what I claim as new, and desire to secure by Letters Patent, is—

1. A grain-separator comprising the main cleaning shoe and fan, an inclined open slat-belt, the inclined floors F and Q, the lower one, F, having a slot for the passage of the separated grain, and the secondary cleaning-screen, fan, and conveyers, substantially as herein described.

2. A grain-separator comprising the main carrying-belt and straw-carrier, beaters and pickers, and cleaning-shoe, an open inclined traveling belt moving over partial floors or bottoms, the lower floor being slotted to allow the grain to fall through a partially-covered rack beneath said slot upon which the grain and unthrashed heads are received, a cleaning-shoe situated beneath said rack, and fans and conveyers for grain and unthrashed heads, substantially as herein described.

In witness whereof I have hereunto set my hand.

RUFUS MYCAJAH COCHRAN.

Witnesses:
WM. C. MURDOCH,
GEO. W. FREEMAN.